United States Patent
Hayashi et al.

(10) Patent No.: US 7,654,605 B2
(45) Date of Patent: Feb. 2, 2010

(54) ROOF OPENING/CLOSING APPARATUS

(75) Inventors: Kenichiro Hayashi, Okazaki (JP); Noboru Iwanaga, Aichi-ken (JP); Katsura Inoue, Chiryu (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 12/292,627

(22) Filed: Nov. 21, 2008

(65) Prior Publication Data

US 2009/0140555 A1 Jun. 4, 2009

(30) Foreign Application Priority Data

Nov. 29, 2007 (JP) ............... 2007-308249

(51) Int. Cl.
*B60J 7/19* (2006.01)
(52) U.S. Cl. .................. 296/121; 296/108; 296/107.12
(58) Field of Classification Search ................. 296/121, 296/108, 107.15, 107.16, 107.17, 107.01, 296/107.12
See application file for complete search history.

(56) References Cited

U.S. PATENT DOCUMENTS

| | | | |
|---|---|---|---|
| 5,944,375 A | | 8/1999 | Schenk |
| 6,585,310 B1 * | | 7/2003 | Guillez et al. ............... 296/108 |
| 6,786,529 B2 * | | 9/2004 | Hasselgruber et al. ...... 296/108 |
| 6,799,789 B2 * | | 10/2004 | Guillez et al. ............... 296/121 |
| 7,014,245 B2 | | 3/2006 | Yoshida |
| 7,029,053 B2 * | | 4/2006 | Heller et al. ................. 296/121 |
| 7,364,217 B2 * | | 4/2008 | Obendiek et al. ........... 296/108 |
| 7,513,563 B2 * | | 4/2009 | Guillez et al. ............... 296/121 |
| 7,559,585 B2 * | | 7/2009 | Plesternings et al. ........ 292/201 |
| 2004/0046416 A1 * | | 3/2004 | Heller et al. ................. 296/121 |
| 2004/0061355 A1 | | 4/2004 | Guillez et al. |
| 2005/0140165 A1 * | | 6/2005 | Heller et al. ................. 296/121 |
| 2005/0242617 A1 * | | 11/2005 | Guillez et al. ............... 296/121 |

FOREIGN PATENT DOCUMENTS

| DE | 19634511 C1 | 1/1998 |
|---|---|---|
| EP | 1 531 072 A1 | 5/2005 |
| JP | 3349410 | 9/2002 |
| JP | 2005-145303 | 6/2005 |
| WO | WO 02/49865 | 6/2002 |

OTHER PUBLICATIONS

European Search Report dated Mar. 19, 2009.

* cited by examiner

*Primary Examiner*—Glenn Dayoan
*Assistant Examiner*—Gregory Blankenship
(74) *Attorney, Agent, or Firm*—Finnegan, Henderson, Farabow, Garrett & Dunner, LLP

(57) ABSTRACT

A roof opening/closing apparatus includes a roof moved between first and second positions and structured with first, second and third panels, a first supporting mechanism movably supporting the first and second panels in association with each other, a second supporting mechanism movably supporting the third panel, a first lock mechanism locking the first panel to the vehicle body, a second lock mechanism locking the first supporting mechanism, and a third lock mechanism locking the third panel to the second panel. The roof is moved between the first position and the second position by the first and second supporting mechanisms and retained at the first position by the first to third lock mechanisms. The second and third lock mechanisms are connected to each other by an operational member and operated in association with each other to release locking operations thereof by the operational member.

5 Claims, 7 Drawing Sheets

Front direction ⟵

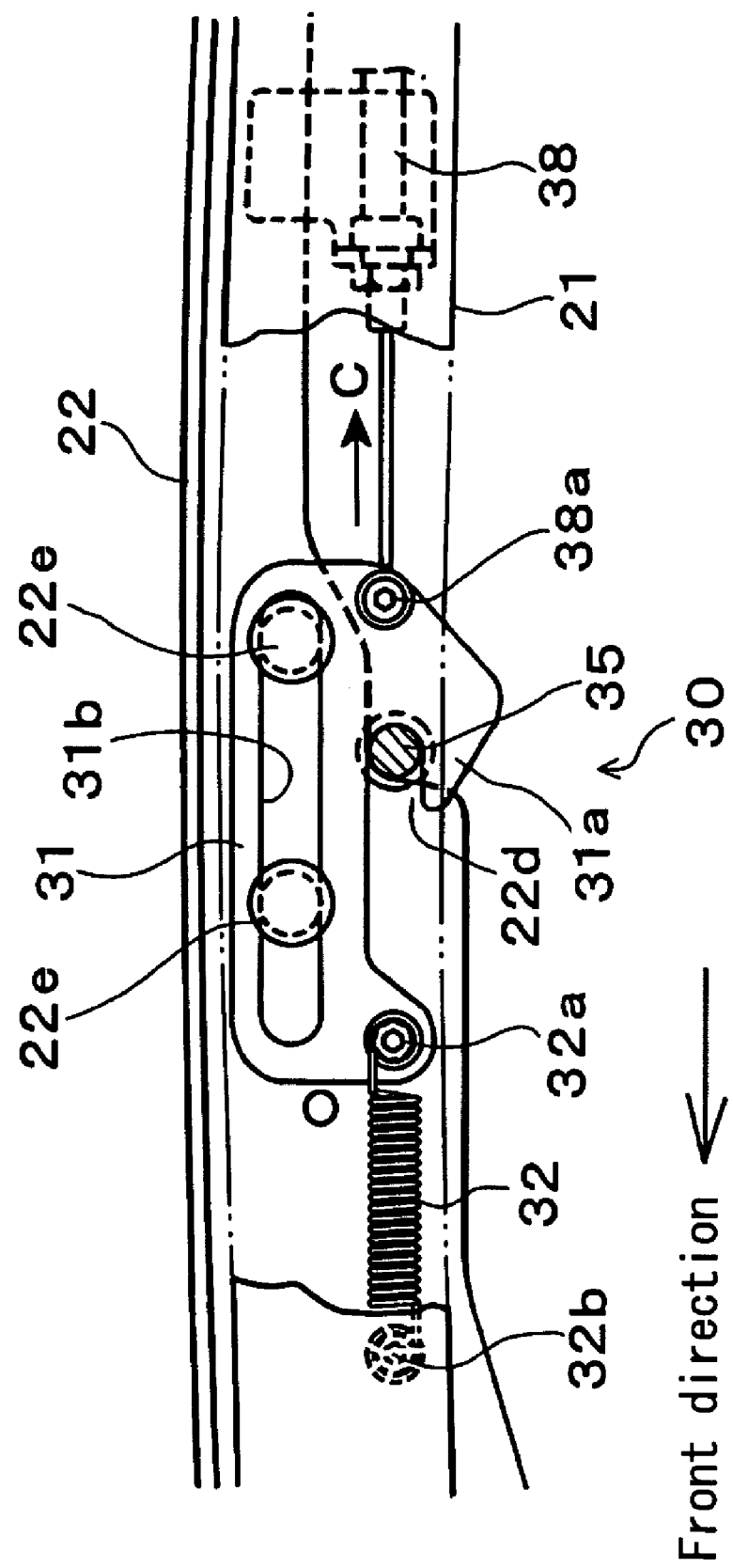

ROOF OPENING/CLOSING APPARATUS

CROSS REFERENCE TO RELATED APPLICATIONS

This application is based on and claims priority under 35 U.S.C. §119 to Japanese Patent Application 2007-308249, filed on Nov. 29, 2007, the entire content of which is incorporated herein by reference.

FIELD OF THE INVENTION

The present invention generally relates to a roof opening/closing apparatus.

BACKGROUND

There exists a vehicle such as a convertible automobile having a roof opening/closing apparatus, which includes a roof structured with two panels. Such two panels are aligned in a longitudinal direction of the vehicle when an upper portion of a vehicle compartment is covered with the roof. Further, the panels can be folded and moved towards a luggage compartment provided at a back portion of the vehicle so as to be accommodated therein.

Such roof opening/closing apparatus includes a supporting apparatus for supporting the two panels, a front lock mechanism and a rear lock mechanism. The front lock mechanism locks one of the panels (front panel), which is located at the front side of the other panel (rear panel), to a vehicle body when the roof is located at a position for covering the upper portion of the vehicle compartment (hereinafter, referred to as extended position). The rear lock mechanism locks the supporting apparatus for maintaining a state where the two panels are longitudinally aligned when the roof is located at the extended position. The front lock mechanism and rear lock mechanism is connected to each other by means of a flexible cable. Therefore, the front and rear lock mechanisms are operated to simultaneously cooperate to unlock when moving the roof towards a position at which the roof is retracted to be accommodated in the luggage compartment. (hereinafter, referred to as retracted position).

According to an apparatus disclosed in JP3349410B (hereinafter, referred to as reference 1), the front lock mechanism is fixedly attached at the front panel, and the rear lock mechanism is fixedly attached at the rear panel.

Further, according to an apparatus disclosed in JP2005-145303A (hereinafter, referred to as reference 2), for example, a roof structured with three panels and moved between the extended position and the retracted position, has been proposed.

According to the apparatus for operating the roof structured with the two panels to move for opening and closing the upper portion of the vehicle compartment, which is disclosed in the reference 1, the cable serving as a connecting member for connecting the front and rear lock mechanisms is bent when the front and rear panels are folded. Therefore, so as not to be damaged even by being bent repeatedly, the cable is required to be loosely arranged between the front and rear lock mechanism in a manner where the cable is widely curved. Therefore, a sufficiently wide space is required to accommodate the curved (bent) cable. Further, a design for preventing interference of the cable with other portions of the vehicle is also required.

Still further, because the front and rear lock mechanism are operatively connected and operated in association with each other, balance of an assembling between the front and rear panel and an assembling between those panels and the vehicle body is required to be adjusted in an assembling process of the vehicle. Thus, the assembling of those members to the vehicle may be complicated.

A need thus exists for a roof opening/closing apparatus, which is not susceptible to the drawback mentioned above.

SUMMARY OF THE INVENTION

According to an aspect of the present invention, a roof opening/closing apparatus includes a roof, a first supporting mechanism, a second supporting mechanism, a first lock mechanism, a second lock mechanism and a third lock mechanism. The roof is adapted to be provided at a vehicle and operated to move between a first position, at which the roof is extended to cover an upper portion of a vehicle compartment, and a second position, at which the roof is retracted to be accommodated in an accommodating space provided at a rear side of the vehicle. Further, the roof is structured with a first panel, a second panel and a third panel, which are longitudinally aligned from a front side to the rear side of the vehicle in series when the roof is located at the first position. The first supporting mechanism is connected to a vehicle body. Further, the first supporting mechanism movably supports the first panel and the second panel in association with each other. The second supporting mechanism is connected to the vehicle body and movably supports the third panel. The first lock mechanism is provided at the first panel and locks the first panel to the vehicle body. The second lock mechanism is provided at the second panel and locks the first supporting mechanism to maintain a predetermined associated state between the first panel and the second panel. The third lock mechanism is provided at the second panel and locks the third panel to the second panel. The roof is operated to move between the first position and the second position by the first supporting mechanism and the second supporting mechanism and is retained at the first position by a locking operation of each of the first lock mechanism, the second lock mechanism and the third lock mechanism. The second lock mechanism and the third lock mechanism are connected to each other by an operational member and operated in association with each other to release the locking operation of each of the second and third lock mechanisms by the operational member.

BRIEF DESCRIPTION OF THE DRAWINGS

The foregoing and additional features and characteristics of the present invention will become more apparent from the following detailed description considered with reference to the accompanying drawings, wherein:

FIG. 7 is an enlarged perspective view illustrating the roof opening/closing apparatus seen from an arrow VII in FIG. 4.

DETAILED DESCRIPTION

An embodiment of the present invention will be described hereinafter with reference to the attached drawings.

Figure 1:
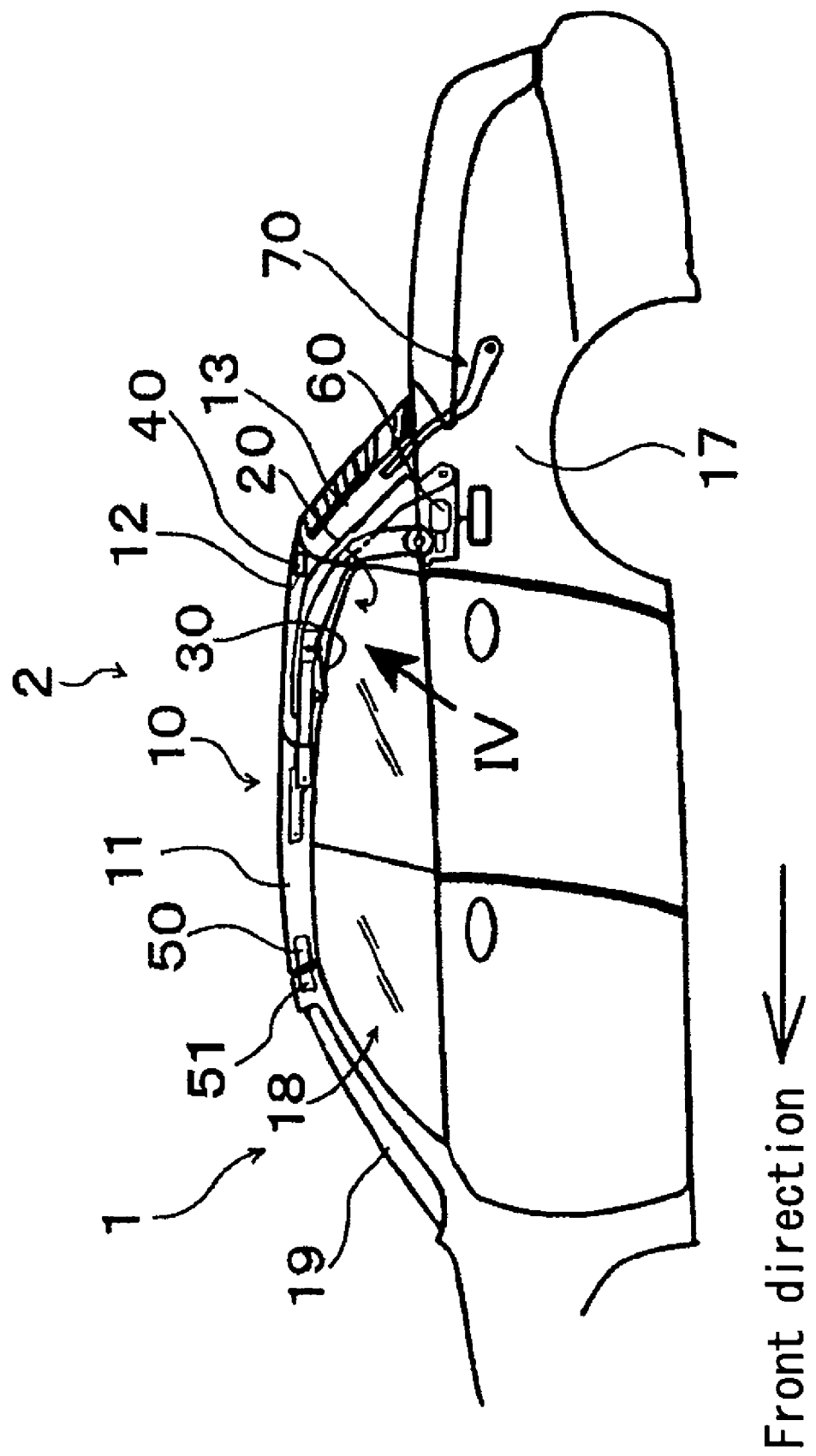
FIG. 1 is a side view schematically illustrating a vehicle including a roof opening/closing apparatus and a roof located at an extended position, according to the embodiment.
Figure 3:
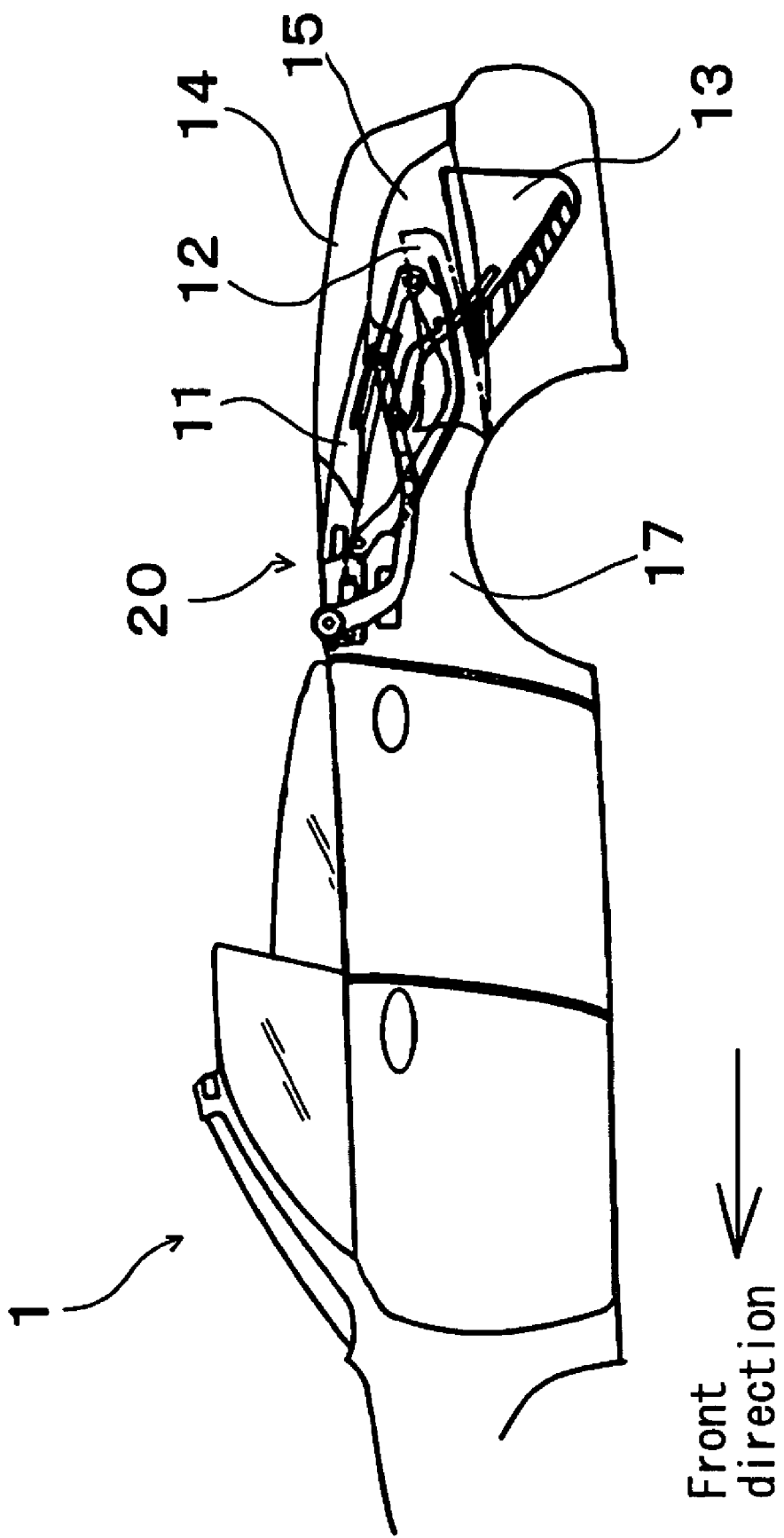
FIG. 3 is a side view schematically illustrating the vehicle including the roof opening/closing apparatus and the roof located at the retracted position.

As illustrated in FIGS. 1 and 3, a roof 10 of a vehicle 1 is moved between an extended position (serving as a first position) and a retracted position (serving as a second position) by a roof opening/closing apparatus (hereinafter, referred to as opening/closing apparatus) 2. When being at the extended position, the roof 10 is extended to cover an upper portion of a vehicle compartment 18. On the other hand, when being at the retracted position, the roof 10 is moved (retracted) to be accommodated in an accommodating space 15 provided at a rear portion (rear side) of the vehicle 1. Hereinafter, directions, such as "longitudinal (front and rear)", "lateral (right and left)", "vertical (upper and lower)", and the like correspond to an orientation of the vehicle 1. In the drawings, the front direction of the vehicle is indicated with an arrow.

As illustrated in FIG. 1, the roof 10 is structured with a front panel 11 (serving as a first panel), an intermediate panel 12 (serving as a second panel) and a rear panel 13 (serving as a third panel), which are longitudinally aligned from a front side of the vehicle 1 to the rear side of the vehicle 1 in series when the roof 10 is located at the extended position.

The front panel 11 and the intermediate panel 12 are movably supported by a first supporting mechanism 20 assembled at a vehicle body 17. The rear panel 13 is movably supported by a second supporting mechanism 70 assembled at the vehicle body 17.

Figure 2:
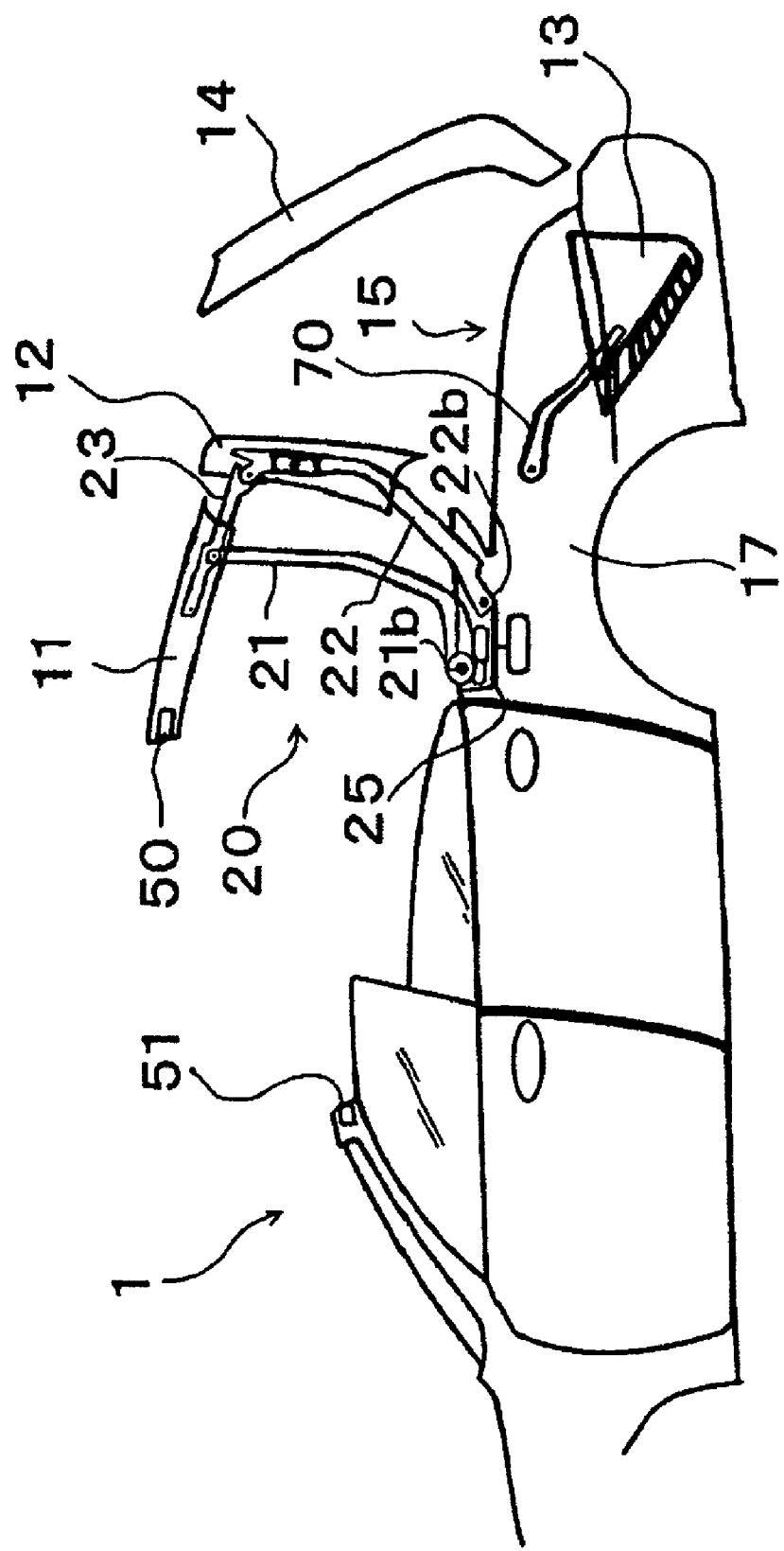
FIG. 2 is a side view schematically illustrating the vehicle including the roof opening/closing apparatus and the roof being moved between the extended position and a retracted position.
Figure 4:
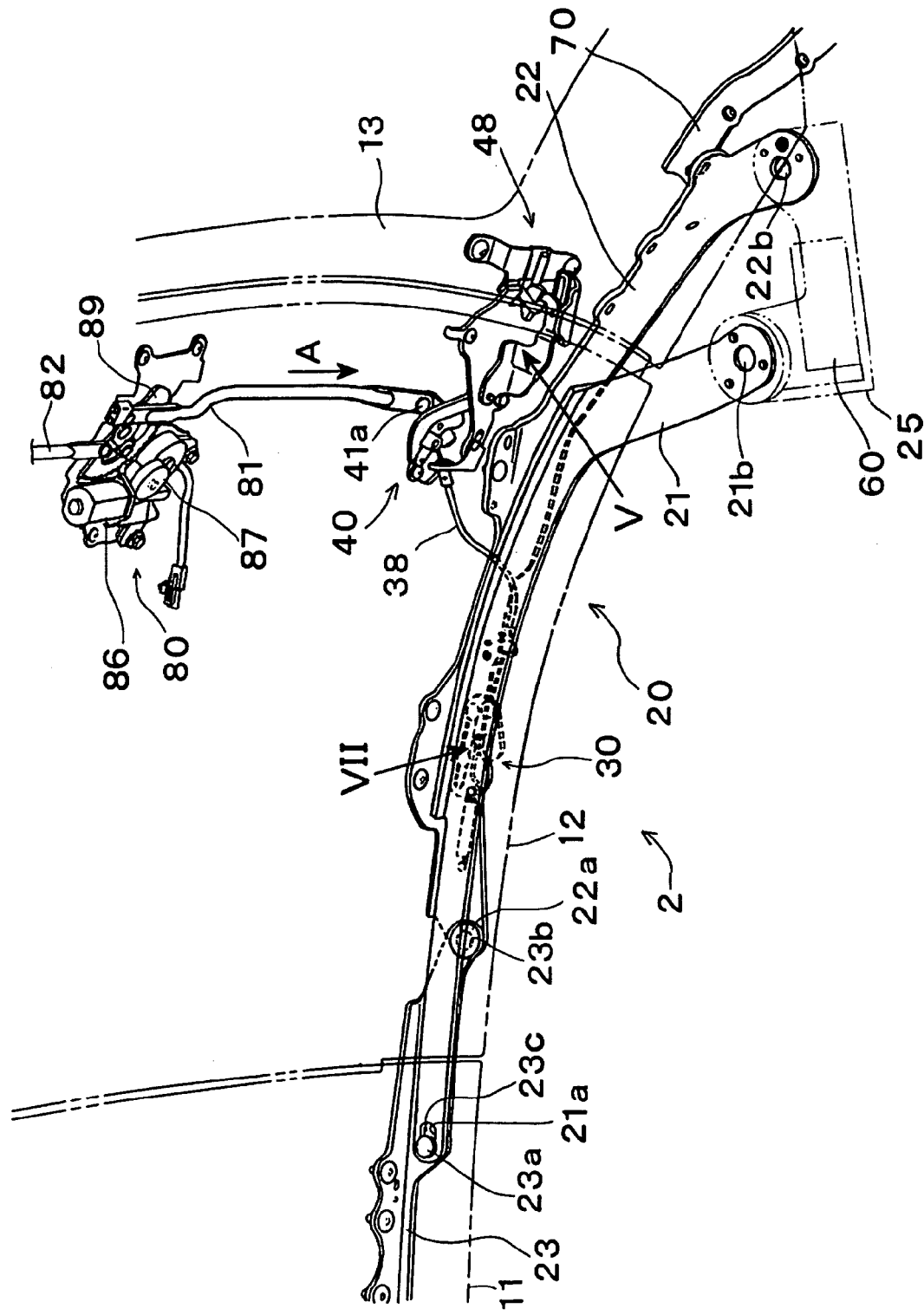
FIG. 4 is a perspective view illustrating the roof opening/closing apparatus seen from an arrow IV in FIG. 1.

As illustrated in FIGS. 2 and 4, the first supporting mechanism 20 includes a base portion 25 (serving as a second link), a front link 21 (serving as a fourth link) and a rear link 22 (serving as a third link). The base portion 25 is fixed at the vehicle body 17. One end of the rear link 22 (serving as a first end of the third link) is rotatably connected to the base portion 25 by a rotational shaft 22b. One end of the front link 21 (serving as a first end of the fourth link) is also rotatably connected to the base portion 25 by a rotational shaft 21b at a forward position relative to a connecting position between the rear link 22 and the supporting link 23. In a state illustrated in FIG. 2 (where the roof 10 is moved between the extended position and the retracted position), the front link 21 and the rear link 22 extend upwardly from the base portion 25 so as to be in parallel with each other.

Another end of the front link 21 (serving as a second end of the fourth link) and another end of the rear link 22 (serving as a second end of the third link) are rotatably connected to a supporting link 23 (serving as a first link). In other words, as best shown in FIG. 2, the supporting link 23 is assembled at upper end portions of the front and rear links 21, 22, so as to connect therewith. As illustrated in FIG. 4, a rotational shaft 23a (serving as a first rotational shaft) is fixed at a front portion of the supporting link 23. Further, a shaft hole 23b (serving as a second shaft hole) is formed at a rear end portion of the supporting link 23. The rotational shaft 23a is rotatably fitted into a shaft hole 21b (serving as a first shaft hole) formed at the front link 21. A rotational shaft 22a (serving as a second rotational shaft) fixed at the rear link 22 is rotatably fitted into the shaft hole 23b.

Further with reference to FIG. 4, the rotational shaft 22a fixed at the rear link 22 is fitted into the shaft hole 23b of the supporting link 23 with a minimum clearance therebetween so that the rotational shaft 22a is allowed only to rotatably move. On the other hand, the shaft hole 21a of the front link 21 is formed in an elongated shape extending in a longitudinal direction thereof (i.e., in the longitudinal direction of the vehicle when the roof 10 is located at the extended position). Therefore, a space is defined between the rotational shaft 23a and at least one of a front end (serving as a first longitudinal end) of the shaft hole 21b and a rear end (serving as a second longitudinal end) thereof, thereby allowing the rotational shaft 23a to slightly move in the longitudinal direction.

In a state illustrated in FIG. 4 (where the roof 10 is located at the extended position), the supporting link 23 is fixedly assembled at a lower surface of the front panel 11. Further, the rear link 22 is fixedly assembled at a lower surface of the intermediate panel 12. As described above, the front link 21 and the rear link 22 are rotatably connected to the supporting link 23 and to the base portion 25, thus structuring a so-called four-link mechanism.

Further, a driving device 60 is assembled at the base portion 25. The driving device 60 transmits a rotational driving force to the front link 21 for driving the first supporting mechanism 20. An actuation of the driving device 60 is controlled by a controlling device.

As illustrated in FIGS. 1 to 3, the rear panel 13 is supported by the second supporting mechanism 70 which includes a driving device and rotatably (pivotably) moved thereby. The second supporting mechanism 70 has a function for rotating, or pivotally moving the rear panel 13 backwardly (i.e., in a clockwise direction in FIG. 1) from an extended position of the rear panel 13 illustrated in FIG. 1 to an retracted position thereof where the rear panel 13 is accommodated in the accommodating space 15 as illustrated in FIG. 2. The second supporting mechanism 70 further has a function for returning the rear panel 13 from the retracted position to the extended position thereof.

In order to retract the front panel 11, the intermediate panel 12 and the rear panel 13 to the accommodated space 15, first, an operation mechanism opens a luggage compartment door 14. Then, the second supporting mechanism 70 is operated to move the rear panel 13 to be retracted into the accommodating space 15. Second, the first supporting mechanism 20 is operated to move the front panel 11 and the intermediate panel 12 to be retracted into the accommodating space 15. In order to return the roof 10 (the front panel 11, the intermediate panel 12 and the rear panel 13) to the extended position from the retracted position, the front panel 11, the intermediate panel 12 and the rear panel 13 are moved in a reversing process of the process described above for retracting those panels. In order to control a retracting operation and an extending operation for returning the roof 10 to the extended position, a control device memorizing a predetermined operational control program is provided at the opening/closing apparatus 2.

In order to retain the roof 10 at the extended position for covering the upper portion of the vehicle compartment 18, a front lock mechanism 50 (serving as a first lock mechanism) is assembled at the front panel 11. The front lock mechanism 50 is employed for locking the front panel 11 to the vehicle body 17 at an upper portion of a front window 19. Further, a catch 51, which is to be engaged with the front lock mechanism 50, is assembled at the vehicle body 17. Still further, a driving device is assembled at the front panel 11 for operating the front lock mechanism 50 to release the lock between the front lock mechanism 50 and the catch 51. An intermediate lock mechanism 30 (serving as a second lock mechanism) is assembled at the first supporting mechanism 20. The intermediate lock mechanism 30 is employed for locking the first supporting mechanism 20 thereby maintaining the front panel 11 and the intermediate panel 12 at the extended position of the roof 10 illustrated in FIG. 1. Herein, a state where the front panel 11 and the intermediate panel 12 are located at the extended position of the roof 10 by being locked by the intermediate lock mechanism 30 via the first supporting mechanism 20 corresponds to a predetermined associated state between the front panel 11 and the intermediate panel 12.

As illustrated in FIGS. 4 and 7, the intermediate lock mechanism 30 includes a hook 31 (serving as a first locking member) and a locking pin 35 (serving as a second locking member). The hook 31 includes a guide hole 31b extending in the longitudinal direction in FIG. 7. First and second guide pins 22e are assembled at the rear link 22 and fitted into the guide hole 31b, thus connecting the hook 31 to the rear link 22. A predetermined distance is provided between the first and second guide pins 22e in the longitudinal direction. Thus, the hook 31 is guided to move in the longitudinal direction. Further, an engagement hook portion 31b is formed at the hook 31. The locking pin 35 is assembled at the front link 21 and is surrounded by the engagement hook portion 31a and a shoulder portion 22d formed at the rear link 22. Accordingly, movements of the front link 21 and the rear link 22 are restrained by each other.

A spring 32 for maintaining an engagement between the locking pin 35 and the hook 31 is provided between the hook 31 and the rear link 22 by means of connecting members 32a and 32b. The spring 32 biases the hook 31 in the front direction in FIG. 7. On the other hand, a cable 38 (serving as an operational member) is assembled on the hook 31, at a position where the hook 31 faces an assembling position of the spring 32, by means of an assembling member 38b. The cable 38 is operated in association with the operation of a rear lock mechanism 40 (see FIG. 5) and releases an engagement between the hook 31 assembled at the rear link 22 and the locking pin 35 assembled at the front link 21 by backwardly pulling the hook 31 against the spring 32 as illustrated in FIG. 7.

Figure 5:
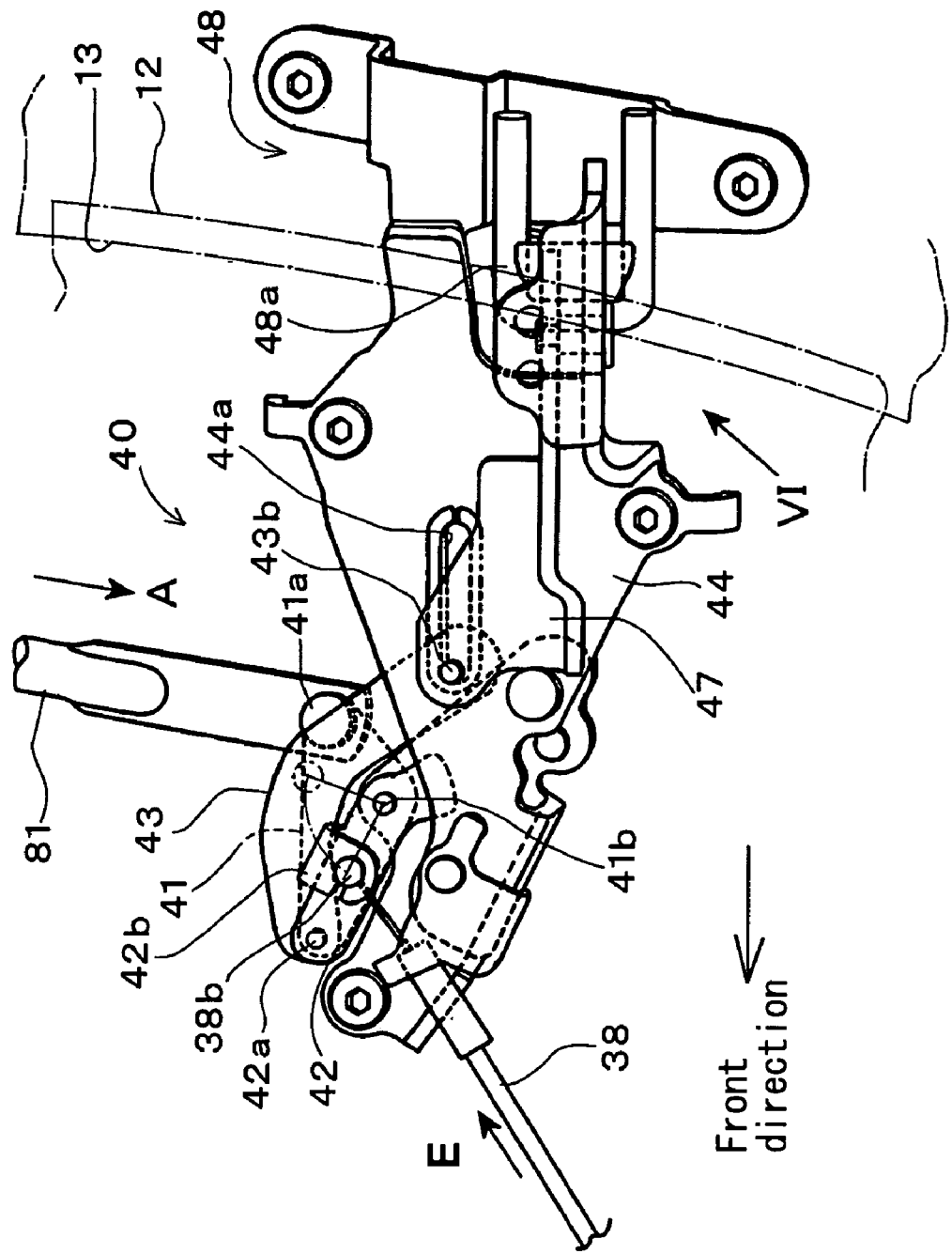
FIG. 5 is a perspective view illustrating the roof opening/closing apparatus seen from an arrow V in FIG. 4.

The rear lock mechanism 40 (serving as a third lock mechanism) for locking the intermediate panel 12 and the rear panel 13 relative to each other is assembled at the intermediate panel 12 and the rear panel 13. As illustrated in FIGS. 4 and 5, the rear lock mechanism 40 is assembled on the intermediate panel 12. Further, a catch 48, which is to be engaged with the rear lock mechanism 40, is assembled on the rear panel 13.

Figure 6:
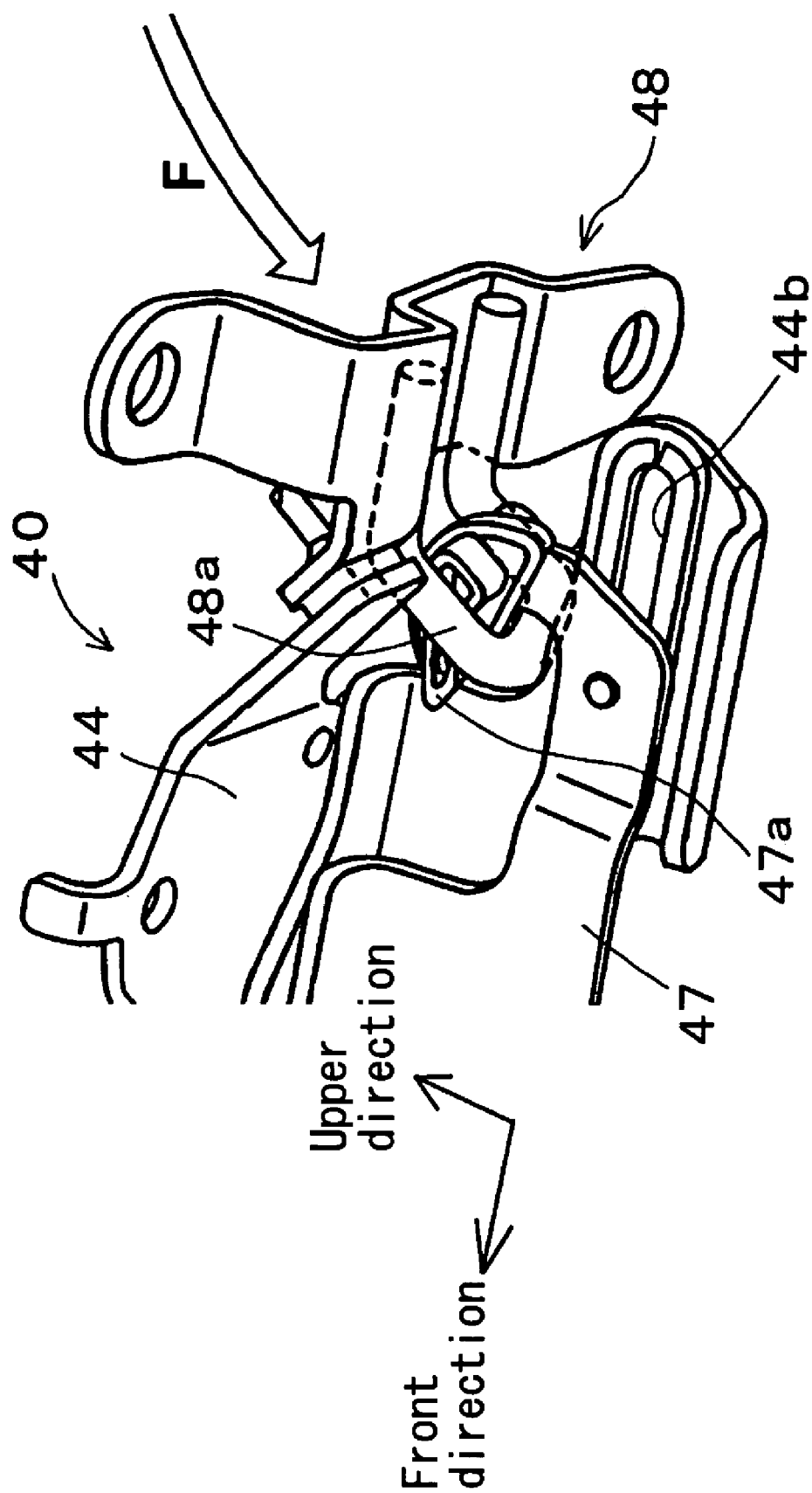
FIG. 6 is a perspective view illustrating the roof opening/closing apparatus seen from an arrow VI in FIG. 5.

The rear lock mechanism 40 includes a hook portion 47. With reference to FIG. 6, the hook portion 47 is engaged with the catch 48. The hook portion 47 is movably guided in the front and rear direction relative to a base 44 fixedly assembled on the intermediate panel 12 by means of guide portions 44a and 44b. Further, the hook portion 47 is biased in the front direction by a biasing means thereby maintaining the engagement between the hook 47 and the catch 48.

When the roof 10 is returned from the state indicated in FIG. 2 to the extended position indicated in FIG. 1, the catch 48 which is released from the engagement with the hook 47 is moved on a path F indicated in FIG. 6 to approach the hook portion 47. Next, an inclined surface of a resin guide portion 47a integrally formed at a rear end of the hook portion 47 makes contact with an engagement portion 48a of the catch 48. Then, the hook portion 47 is moved backwardly (in the right direction in FIG. 6), thereby automatically engaging the catch 48 with the hook portion 47 of the rear lock mechanism 40.

As described above, when the roof 10 is located at the extended position, the front panel 11 is locked at the vehicle body 17 by the front lock mechanism 50. Further, the front panel 11 and the intermediate panel 12 are supported by the first supporting mechanism 20 locked by the intermediate lock mechanism 30, and the rear panel 13 is locked at the intermediate panel 12 by the rear lock mechanism 40, thereby firmly locking the roof 10 to the vehicle body 17.

Next, a structure for unlocking the front lock mechanism 50, the intermediate lock mechanism 30, and the rear lock mechanism 40 when the roof 10 is moved from the extended position to the state indicated in FIG. 2 will be described hereinafter in detail.

The front lock mechanism 50 includes a driving device which is electrically operated. When an electric force for operating the driving device of the front lock mechanism 50 is supplied from a controlling device of the opening/closing apparatus 2, the front lock mechanism 50 is released from the engagement with the catch 51 and the lock between the front panel 11 and the vehicle body 17 is released.

As illustrated in FIGS. 4, 5 and 7, the intermediate lock mechanism 30 and the rear lock mechanism 40 are connected with each other by the cable 38. Therefore, the intermediate lock mechanism 30 and the rear lock mechanism 40 are operated in association with each other to release locking operations thereof.

As illustrated in FIG. 4, the driving apparatus 80 is assembled at a laterally intermediate portion of the intermediate panel 12 (an intermediate portion in a width direction of the vehicle 1). The driving apparatus 80 is employed for operating the intermediate lock mechanism 30 and the rear lock mechanism 40 to perform unlocking operations. Further, the driving apparatus 80 includes an electric motor 86 for rotating a sector gear 89 via a reduction mechanism 87. One end of a first connecting rod 81 and one end of a second connecting rod 82 are rotatably connected to the sector gear 89 at so as to face each other by interposing a rotational shaft therebetween. The first connecting rod 81 extends in the laterally right direction of the vehicle 1, while the second connecting rod 82 extends in the laterally left direction of the vehicle 1.

The other end of the first connecting rod 81 is connected to a rotational lever 41, which is provided at the rear lock mechanism 40, by means of a pin 41b. Although the rear lock mechanism 40 assembled at the right side portion of the vehicle 1 is illustrated in FIG. 4, another rear lock mechanism 40 is assembled at the left side portion of the intermediate panel 12 at a symmetrical position of the position where the right rear lock mechanism 40 is located. Further, the other end of the second connecting rod 82 is connected to the left rear lock mechanism 40.

The rotational lever 41 of the rear lock mechanism 40 is connected to the base 44 by a rotational shaft 41b so as to rotate in a clockwise direction in FIG. 5 by means of the connecting rod 81 operated to move in a direction indicated with an arrow A (hereinafter, referred to as direction A) by an operation of the driving apparatus 80.

One end of a connecting lever 43 is rotatably connected to the rotational lever 41 via a pin 42a. Another end of the connecting lever 43 is rotatably connected with the hook portion 47 by means of a pin 43b. When the first connecting rod 81 is moved in the direction A, the rotational lever 41 rotates and the hook portion 47 moves in the right direction in FIG. 5 (i.e., in the backward direction of the vehicle). Thus, the hook portion 47 moves backwardly, thereby releasing the engagement between the hook portion 47 and the catch 48.

Further as illustrated in FIG. 5, a cable arm 42 is assembled on a rotational shaft 41b of the rotational lever 41. The cable arm 42 is connected to the rotational lever 41 by means of the pin 42a so as to rotate integrally with the rotational lever 41. A locking portion 42b is provided at a substantially intermediate portion of the cable arm 42. A first end portion 38a of the cable 38 is connected to the hook 31 of the intermediate lock mechanism 30 (see FIG. 7), and a second end portion 38b of the cable 38 is locked at the locking portion 42b of the cable arm 42 (see FIG. 5). So configured, when the first connecting rod 81 is operated to move in the direction A, the rear lock mechanism 40 is unlocked and the cable arm 42 rotates in the clockwise direction in FIG. 5. Therefore, the second end portion 38b of the cable 38 is pulled in a direction of an arrow E as indicated in FIG. 5 (hereinafter, referred to as direction E). Then, the hook 31 of the intermediate lock mechanism 30 is moved in a direction of an arrow C as indicated in FIG. 7 (hereinafter, referred to as direction C), so that the intermediate lock mechanism 30 is unlocked simultaneously in cooperation with the rear lock mechanism 40.

Due to the opening/closing apparatus 2 structured as described above, the intermediate lock mechanism 30 and the rear lock mechanism 40 connected by the cable 38 are assembled at the intermediate panel 12. Therefore, when the roof 10 is operated to move to the retracted position and to the extended position, the cable 38 is not repeatedly bent. In other words, the cable 38 is not required to be loosely arranged in order to be bent. Accordingly, a structure where the cable 38 does not interfere with other portions such as the vehicle body 1 is readily realized. Further, because the cable 38 is not largely bent thereby not requiring a space for accommodating the bent cable, the accommodating space 15 is effectively utilized as a space for accommodating objects such as luggage.

Further according to the opening/closing apparatus 2, the first supporting mechanism 20 is locked by the intermediate lock mechanism 30, thereby locking the front panel 11 and the intermediate panel 12 with each other. Therefore, the front panel 11 and the intermediate panel 12 are readily assembled to the vehicle body 17. More specifically, the front panel 11 and the intermediate panel 12 are assembled at the first supporting mechanism 20 locked by the intermediate lock mechanism 30 at predetermined positions, respectively. Then, the first supporting mechanism 20 is fixed at the vehicle body 17 so that the front panel 11 and the intermediate panel 12 are located at appropriate positions when being assembled at the vehicle. After that, the front lock mechanism 50 is assembled so that the front panel 11 and the vehicle body 17 are locked with each other. Thus, because the front lock mechanism 50 is structured to perform the locking operation thereof independently from other lock mechanisms (i.e., the intermediate lock mechanism 30 and the rear lock mechanism 40), the assembling of the front lock mechanism 50 is easily executed.

Sealing members are provided between the roof 10 and the vehicle body 17, the roof 10 and the door glass, and between each of the panels 11, 12 and 13 in a compressed manner when the roof 10 is in the extended position (see FIG. 1) so as to prevent external objects such as rainwater and dust from entering therebetween.

According to the opening/closing apparatus 2, the first supporting mechanism 20 is structured with the four-link mechanism. Further, the shaft hole 21a of the front link 12, into which the rotational shaft 23a fixed at the supporting link 23 is fitted, is formed in the elongated shape. A space 23c is provided between the rotational shaft 23a and at least one of the front and rear ends of the shaft hole 21a, so that the rotational shaft 23a is allowed to slightly move in the longitudinal direction of the shaft hole 21a. Therefore, in comparison with a structure where rotational shafts of all of four link mechanisms are allowed only to rotate relative to corresponding shaft holes, the supporting link 23 and the rear link 22 of the first supporting mechanism 20 are moved slightly after the rotation of the front link 21 driven by the driving device 60. In other words, with such configuration, a play is formed at the link mechanism.

In a condition where the roof 10 is returned to the extended position (see FIG. 1) from the state indicated in FIG. 2 by the operation of the supporting link 23, when an end portion of the front panel 11 approaches the vehicle body 17 to sufficiently compresses the sealing member provided between the roof 10 and the door glass, the state of the front lock mechanism 50 is switched to the locked state. At this time, the rear link 22 rotates slightly after the rotation of the front link 21. Therefore, the intermediate panel 12 does not reach a position for sufficiently compressing the sealing member provided between the roof 10 and the vehicle body 17. Further, the intermediate lock mechanism 30 is not in a state of locking the first supporting mechanism 20.

Then, because of the operation of the second supporting mechanism 70, the rear panel 13 rotates to be located at the position indicated in FIG. 1. The catch 48 assembled at the front end portion of the rear panel 13 is engaged with the rear lock mechanism 40 assembled at the intermediate panel 12, thereby locking the intermediate panel 12 and the rear panel 13 with each other.

In a state shown in FIG. 1, the rear end of the intermediate panel 12 overlaps the front end of the rear panel 13 with the sealing member interposed therebetween so that the rear end of the intermediate panel 12 is located at a lower side of the front end of the rear panel 13. Accordingly, the intermediate panel 12, which does not yet reach the position for sufficiently pressing the sealing member between the roof 10 and the vehicle body 17, is pressed downwardly to reach the position where the sealing member is sufficiently pressed by the rear panel 13. As a consequence of a series of operations described above, the intermediate lock mechanism 30 locks the first supporting mechanism 20, and the roof 10 structured with the front panel 11, the intermediate panel 12 and the rear panel 13 is securely locked at a position predetermined when assembled to the vehicle body 17.

In the process for operating the roof 10 to move to the extended position illustrated in FIG. 1, the front panel 11, the intermediate panel 12 and the rear panel 13 compress the sealing members in order from the front side to the rear side of the vehicle. Therefore, a flexible bending or a warp, which may be partially generated at the sealing member, is not generated.

Further, according to the embodiment described above, the shaft hole 21b of the front link 21, at which the rotational shaft 23a fixed at the supporting link 23, is formed in the elongated hole. Alternatively, the shaft hole 23b, which is formed at the rear end of the supporting link 23 and into which the rotational shaft 22a of the front link 21 is fitted, may be formed in an elongated hole and a space may be generated between the rotational shaft 22a and the shaft hole 23b. Still further, although the shaft hole 21b is formed at the front link 21 and the rotational shaft 23a is fixed at the supporting link 23, the shaft hole 21a may be formed at the supporting link 23 and the rotational shaft 23a may be fixed at the front link 21. In the same manner, the shaft hole 23b formed at the supporting link 23 may be formed at the rear link 22 and the rotational shaft 22a connected at the rear link 22 may be connected at the supporting link 23. So configured, the same effect of the embodiment described above may be obtained.

Due to the above described structure, the predetermined associated state between the front panel 11 and the intermediate panel 12 is maintained by the first supporting mechanism 20 which supports the front and intermediate panels 11, 12. First, the front and intermediate panels 11, 12 are assembled to the first supporting mechanism 20 locked by the intermediate lock mechanism 30 thereby arranging a state for covering the upper portion of the vehicle compartment before being assembled to the vehicle 1. Then, the front panel 11 and the intermediate panel 12 are assembled to the vehicle 1 by adjusting a balance between the vehicle 1 and those panels. After that, the front lock mechanism 50 for locking the front panel 11 to the vehicle body 17 is assembled to the front panel 11. Thus, the above described members are easily assembled. As described above, the intermediate lock mechanism 30 and the front lock mechanism 50 are not cooperatively operated, thereby not requiring a connecting member therebetween. Further, the rear lock mechanism 40 and the intermediate lock mechanism 30 are provided at the intermediate panel 12 and are moved in association with each other by the cable 38. Therefore, the cable 38 is not repeatedly bent. Thus, according to the roof opening/closing apparatus 2, the resistibility of the cable 38 is improved, and the panels 11, 12, 13 are easily assembled to the vehicle 1.

Still further, the first supporting mechanism 20 is the four-link mechanism, whish is structured with four links (the front link 21, the rear link 22, the supporting link 23 and the base portion 25). The front link 21 and the rear link 22 are rotatably connected to the supporting link 23 and the base portion 25. Further, one of the shaft hole 21a and the shaft hole 23b extends in the longitudinal direction of the corresponding link 21, 22 so as to define the space 23c between the corresponding rotational shaft 23a, 22a and at least one of the front and rear ends of the shaft hole when the roof 10 is located at the extended position. Due to the embodiment described above, the space 23c is provided between the rotational shaft 23a and at least one of the front and rear ends of the shaft hole 21b, so that the rotational shaft 23a is allowed to slightly move in the longitudinal direction of the shaft hole 21a. Thus, the front panel 11 is allowed to slightly move without being completely restrained by the first supporting mechanism 20. Accordingly, when returning the front panel 11 and the intermediate panel 12 to the extended position of the roof 10, the front lock mechanism 50, the intermediate lock mechanism 30 and the rear lock mechanism 50 are locked in series, and the sealing members provided between the roof 10 and the door glass, the roof 10 and the vehicle body 17, and between each of the panels 11, 12 and 13 are sufficiently compressed to prevent external objects such as water from entering therebetween.

Still further, the front link 21 and the rear link 22 are firmly locked with each other by the intermediate lock mechanism 30. Therefore, the front panel 11 and the intermediate panel 12 are securely maintained at the extended position of the roof 10 by the intermediate lock mechanism 30.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A roof opening/closing apparatus, comprising:
   a roof adapted to be provided at a vehicle and operated to move between a first position, at which the roof is extended to cover an upper portion of a vehicle compartment, and a second position, at which the roof is retracted to be accommodated in an accommodating space provided at a rear side of the vehicle, the roof structured with a first panel, a second panel and a third panel longitudinally aligned from a front side to the rear side of the vehicle in series when the roof is located at the first position;
   a first supporting mechanism connected to a vehicle body and movably supporting the first panel and the second panel in association with each other;
   a second supporting mechanism connected to the vehicle body and movably supporting the third panel;
   a first lock mechanism provided at the first panel and locking the first panel to the vehicle body;
   a second lock mechanism provided at the second panel and locking the first supporting mechanism to maintain a predetermined associated state between the first panel and the second panel; and
   a third lock mechanism provided at the second panel and locking the third panel to the second panel, wherein
   the roof is operated to move between the first position and the second position by the first supporting mechanism and the second supporting mechanism and is retained at the first position by a locking operation of each of the first lock mechanism, the second lock mechanism and the third lock mechanism, and
   the second lock mechanism and the third lock mechanism are connected to each other by an operational member and operated in association with each other to release the locking operation of each of the second and third lock mechanisms by the operational member; and
   wherein the first supporting member includes:
   a first link fixed at the first panel;
   a second link fixed at the vehicle body;
   a third link fixed at the second panel and including a first end rotatably connected to the first link and a second end rotatably connected to the second link;
   a fourth link including a first end rotatably connected to the first link at a forward position relative to a connecting position between the third link and the first link and a second end rotatably connected to the second link;
   a first shaft hole formed at one of the first link and the fourth link;
   a first rotational shaft connected to the other of the first link and the fourth link and fitted into the first shaft hole for rotatably supporting the first link and the fourth link;
   a second shaft hole formed at one of the first link and the third link; and
   a second rotational shaft connected to the other of the first link and the third link and fitted into the second shaft hole for rotatably supporting the first link and the third link,
   and wherein
   one of the first shaft hole and the second shaft hole extends in a longitudinal direction of the corresponding link so as to define a space between the corresponding rotational shaft and at least one of a first longitudinal end and a second longitudinal end thereof when the roof is located at the first position.

2. The roof opening/closing apparatus, according to claim 1, wherein
   the second lock mechanism includes a first locking member provided at the third link and a second locking member provided at the fourth link, and
   the first locking member and the second locking member are engaged with each other for locking the first supporting mechanism.

3. The roof opening/closing apparatus according to claim 1, wherein the operational member is in the form of a cable.

4. The opening/closing apparatus according to claim 1, wherein the first locking member is in the form of a hook.

5. The opening/closing apparatus according to claim 1, wherein the second locking member is in the form of a pin.

* * * * *